United States Patent [19]

Oyaizu

[11] Patent Number: 4,715,333
[45] Date of Patent: Dec. 29, 1987

[54] VALVE TIMING CONTROL MEANS FOR ENGINE

[75] Inventor: Takeshi Oyaizu, Kakegawa, Japan

[73] Assignee: Yamaha Hatsudoki Kabushiki Kaisha, Japan

[21] Appl. No.: 54,236

[22] Filed: May 26, 1987

Related U.S. Application Data

[62] Division of Ser. No. 783,005, Oct. 2, 1985, Pat. No. 4,685,429.

[30] Foreign Application Priority Data

May 14, 1985 [JP] Japan .................. 60-100524

[51] Int. Cl.⁴ .............................................. F01L 1/26
[52] U.S. Cl. ........................ 123/90.31; 123/90.44; 123/90.27
[58] Field of Search .......... 123/90.31, 90.27, 90.44, 123/90.15

[56] References Cited

U.S. PATENT DOCUMENTS

| 2,279,413 | 4/1942 | Read | 123/90.15 |
| 3,422,806 | 1/1969 | DeLorean | 123/90.31 |
| 3,683,875 | 8/1972 | Chadwick | 123/90.15 |
| 4,480,603 | 11/1984 | Tsuboi | 123/90.31 |
| 4,553,473 | 11/1985 | Ichida et al. | 123/90.31 |
| 4,576,127 | 3/1986 | Doi et al. | 123/90.31 |

FOREIGN PATENT DOCUMENTS

| 0012108 | 1/1984 | Japan | 123/90.15 |
| 0079046 | 5/1984 | Japan | 123/90.15 |
| 0313961 | 6/1929 | United Kingdom | 123/90.37 |

Primary Examiner—Ira S. Lazarus
Attorney, Agent, or Firm—Ernest A. Beutler

[57] ABSTRACT

A camshaft drive arrangement for an internal combustion engine including an improved arrangement for adjusting the valve timing during running of the engine. The timing is adjusted by means of a pair of pulleys that are engaged with opposite flights of a timing belt or chain and which are carried by a pivotally supported adjusting lever. The pivotal position of the lever and, according, the valve timing is altered in response to sensed engine conditions.

6 Claims, 5 Drawing Figures

VALVE TIMING CONTROL MEANS FOR ENGINE

This is a division of United States patent application Ser. No. 783,005, filed Oct. 2, 1985, now U.S. Pat. No. 4,685,429.

BACKGROUND OF THE INVENTION

This invention relates to a valve timing control means for engines and more particularly to an improved and simplified arrangement for changing the valve timing of an internal combustion engine.

As is well known, the valve timing of an internal combustion engine comprises a compromise between the timing which will produce the maximum output and the timing which produces the best idle and low speed running characteristics. Like many other factors in engine design, the valve timing is a compromise between these conditions. If maximum power output is to be attained, there should be a substantial degree of overlap between the opening of the intake valve and the closing the exhaust valve so as to insure good charging of the combustion chamber as well as effectie scavenging at the end of combustion. However, such large overlaps can provide extremely poor running under low speed conditions when the exhaust gases escape back into the intake passage during the overlap condition. Thus, as has been noted, the actual valve timing chosen is a compromise between these two conditions.

It has been proposed to provide some arrangement for altering the valve timing of the engine during its running so that optimum valve timing will be provided at all running conditions. Although in theory this sounds like a good solution to the problem, the mechanisms heretofore proposed for this purpose have been complicated, have added to the cost of the engine and have reduced its durability. For example, one type of valve timing adjusting mechanism adjusts the position of the camshaft relative to its driving sprocket so as to afford timing adjustment. Such arrangements can reduce the loads which can be transmitted through the driving connection and may offer the possibility of premature failure. In addition, these mechanisms are relatively complicated. With another form of device, the flexible transmitter (either a timing chain or cogged timing belt) is subjected to a load by a tensioner-type mechanism so as to adjust the valve timing. These type of devices are simpler than those which operate on the connection between the camshaft and its driving sprocket but they tend to increase or vary the tensioning on the driving chain or belt and can cause premature wear of these components. In addition, this type of device causes the actual tensioning on the chain or belt to vary during running and the jumping of teeth is a distinct possibility which can result in destructive loss of valve timing.

It is, therefore, a principal object of this invention to provide an improved and simplified arrangement for adjusting the valve timing of an engine during its running.

It is a further object of this invention to provide a valve timing adjustment mechanism that will not decrease the durability of the engine.

It is a further object of this invention to provide an adjustable valve timing mechanism that operates on the drive for the camshaft and which does not unduly stress that drive.

SUMMARY OF THE INVENTION

This invention is adapted to be embodied in a camshaft drive arrangement that includes a driven pulley that is affixed for rotation with a camshaft, a drive pulley that is affixed for rotation with a drive shaft and flexible transmitter means that is trained around the pulleys for driving the camshaft from the drive shaft. The flexible transmitter means has a first flight that is engaged with one side of one of the pulleys and a second flight that is engaged with the other side of the one pulley. In accordance with the invention, means are provided for adjusting the timing relationship between the camshaft and the drive shaft which comprise a timing lever that is supported for pivotal movement about an axis. First guide means are carried by the timing lever and are engaged with the first flight. Second guide means are also carried by the timing lever and are engaged with the second flight. Means are provided for pivoting the timing lever about its pivot axis whereby the guide means act through the flights of the flexible transmitter means for rotating the one shaft relative to the other of the shafts.

DETAILED DESCRIPTION OF THE PREFERRED EMBODIMENTS

Figure 1:
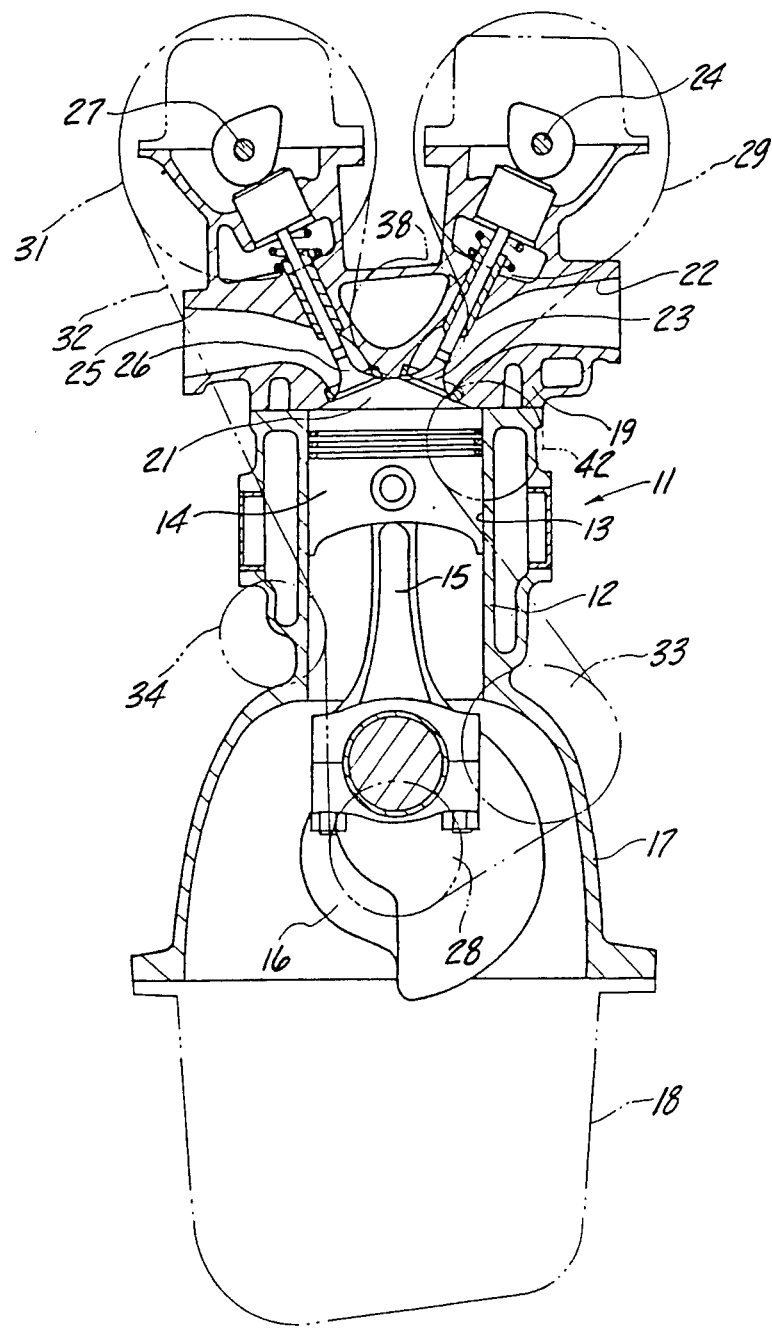
FIG. 1 is a cross-sectional view taken through an internal combustion engine constructed in accordance with an embodiment of the invention.

Referring first to FIG. 1, an internal combustion engine is shown in cross-section and is identified generally by the reference numeral 11. The engine 11, except for the valve driving mechanism, is relatively conventional in configuration and the basic components of the engine are illustrated and described only insofar as is necessary for those skilled in the art to understand the invention, particularly in connection with the two embodiments specifically disclosed.

The engine 11 includes a cylinder block 12 having cylinder bores 13 in which pistons 14 are supported for reciprocation. Each piston 14 is connected, by means of a connecting rod 15, to a crankshaft 16 that is journaled for rotation in a crankcase 17 which is formed in part from the cylinder block 12 and by a crankcase pan 18, which is shown in phantom, and which is attached to the cylinder block 12 in a known manner.

A cylinder head 12 is affixed to the cylinder block 12 and has a number of chambers 21 that mate with the cylinder bores 13 and cooperate with the pistons 14 so as to define chambers of volume which vary as the pistons 14 reciprocate.

Intake ports 22 extend through the cylinder head 19 from an intake manifold (not shown) and terminate at valve seats with which intake valves cooperate. An intake charge is delivered to the chambers 21 through the intake ports 22 at the time when the intake valves 23 are opened. The intake valves 23 are operated by means of lobes of an intake camshaft 24 that is journaled in the cylinder head assembly 19 and which is driven in a manner to be described.

Exhaust ports 25 extend through the side of the cylinder head 19 opposite to the intake port 22 from each of the chambers 21. Exhaust valves 26 are supported by the cylinder head 19 and control the flow through the exhaust ports 25 in a known manner. The exhaust valves 26 are opened and closed by respective lobes on an exhaust camshaft 27 that is journaled in the cylinder head 19 and which is driven in a manner to be described.

As has been previously noted, the construction of the engine as thus far described in conventional and has been given only so that those skilled in the art can understand the environment in which the invention is utilized. Also, although the invention has been described in conjunction with only the single cylinder of a multiple cylinder inline type of engine, it will be readily to those skilled in the act that the invention can be utilized in conjunction with engines of other cylinder configurations such as V-type, etc.

Figure 2:
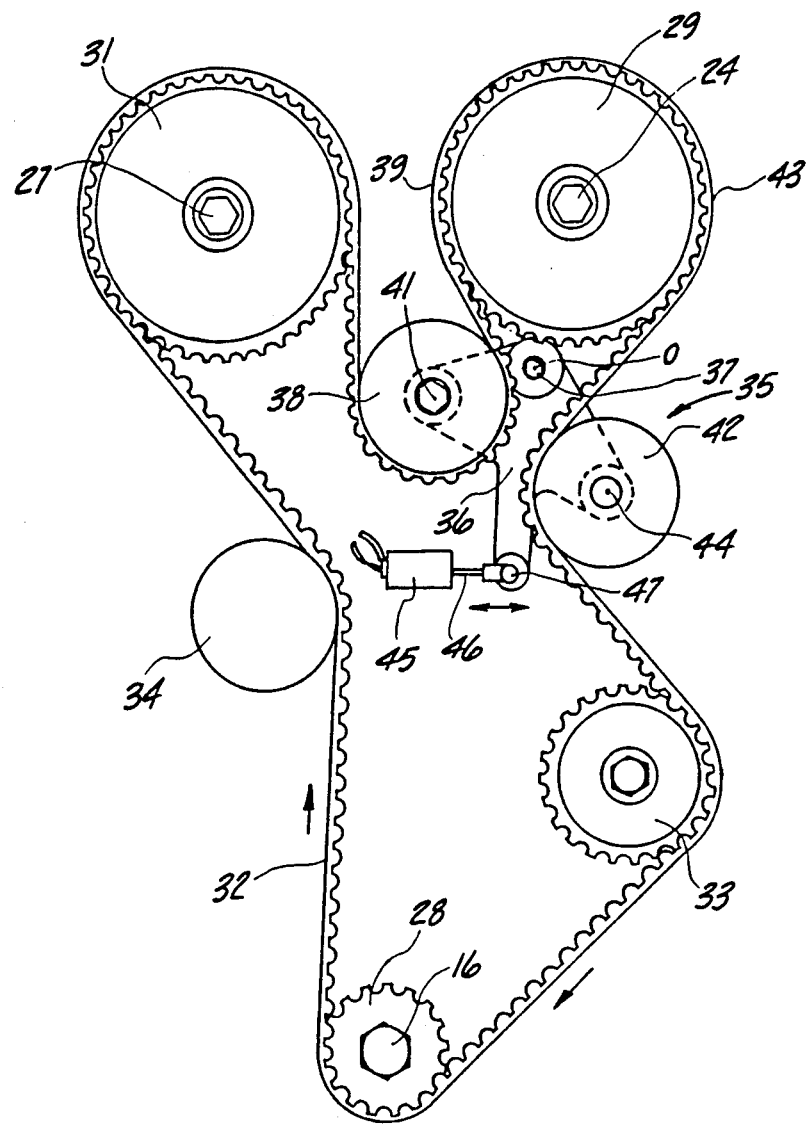
FIG. 2 is an enlarged view showing the timing drive of the camshafts of the engine.

Referring now additionally to FIG. 2, the mechanism for driving the camshafts 24 and 27 from the crankshaft 16 and for altering the timing of the events of the camshafts 24 and 27 and valves 23 and 26 will now be described. A drive sprocket 28 is affixed for rotation with the crankshaft 16. In a similar manner, driven sprockets 29 and 31 are affixed for rotation with the camshafts 24 and 27. The sprockets 29 and 31 are of twice the diameter as the sprocket 28 so that the camshafts 24 and 27 will be driven at one-half crankshaft speed, as is well known in this art.

A flexible transmitter in the form of a toothed belt 32 is trained around the sprockets 28, 29 and 31 for transmitting the drive from the crankshaft 16 to the camshafts 24 and 27. In addition, the belt 32 drives an engine pump such as the water pump or the like by means of a sprocket 33 which is connected to the driving shaft of this accessory. A tensioning pulley 34 is engaged with the flight of the belt 32 that extends from the crankshaft 16 to the exhaust camshaft 27, this being the return or idle side of the belt 32. The pulley 34 is adjustable so as to adjust the tension on the belt 32 in any of the manners normally employed in this art. In this regard, it should be noted that the invention is described in conjunction with a timing belt but it may equally as well be practiced in conjunction with a timing chain.

In accordance with the invention, a timing adjusting mechanism, indicated generally by the reference numeral 35, is provided for adjusting the timing of the intake camshaft 34 relative to the exhaust camshaft 27. This adjusting mechanism also provides certain of the idler functions normally found in engines of this type. The adjusting mechanism 35 includes an adjusting lever 36 that is supported for pivotal movement relative to the cylinder block 12 by means of a pivot pin 37 about an axis O. The axis O extends parallel to and closely adjacent the axis of the intake camshaft 24.

The lever 36 rotatably supports a first sprocket or pulley 38 that is engaged with a flight 39 of the belt 32 on one side of the intake camshaft sprocket 29. The pulley 38 is disposed so that the belt 32 will engage a substantial portion of the circumference of the sprockets 29 and 31, that is, an area more than 180° of the sprocket so as to insure a good load transmission. The pulley 38 is rotatable about an axis 41 that is defined by a pivot pin or shaft that journals it on the lever 36.

A further pulley 42 is journaled on the lever 36 on the opposite side of the sprocket 29 and engages a flight 43 of the belt which runs between this side of the sprocket 29 and the driving sprocket 33 of the accessory pump. The pulley 42 is rotatable about an axis 44 that is defined by a shaft carried by the lever 36.

The lever 36 is pivotal about its axis 37 so as to effect movement of the pulleys 38 and 41 and their engaged belt flights 39 and 43 so as to rotate the sprocket 29 relative to the sprocket 31 and change the valve timing. This change in valve timing may be best understood by reference to FIG. 5.

In this figure, the valve elements are depicted in relation to crankshaft angle and the bottom dead center and top dead center positions of the piston 14 are indicated by the lines BDC and TDC, respectively. The duration of opening of the intake valves 23 and exhaust valves 26 is also noted by the respective bars. It should be noted that this mechanism does not significantly change the duration of the valve events but merely the overlap between them. The top portion of the graph shows the relationship when the timing lever 36 is rotated in a counterclockwise direction toward the extreme end of its stroke and wherein there is minimum overlap between the opening of the intake valve 23 and the closing of the exhaust valve 26. It should be noted that the exhaust valve always opens before bottom dead center and closes slightly after top dead center. When the lever 36 is rotated to its extreme position in the direction L, there is very minimum overlap between the intake and exhaust valves since the intake valve does not open until after top dead center. However, when the lever 36 is rotated in a clockwise direction to its extreme position H, the intake valve will be opened before top dead center and a substantially greater valve overlap will exist.

The lever 36 is rotated, in this embodiment, by means of a solenoid 45 that has its armature 46 connected to the lever 36 by means of a pivot pin 47. The solenoid 45 is actuated so as to pivot the lever between its two extreme positions in response to any desired engine running characteristic. For example, the solenoid 45 may be operated in response to engine speed so that the lever 36 is in the L position at low speeds and in the H position at higher speeds. Alternatively, the lever 36 may be pivoted in response to any other sensed running condition such as engine temperature, load or the like.

Because of the cooperation of the pulleys 36 and 42 and the location of the pivot axis O of the lever 36, the pivotal movement of the lever 36 will not change the tension of the belt 32 and hence the belt 32 will be uniformly tensioned under all running conditions and wear will be substantially minimized as will the likelihood of the engine jumping out of time.

Figure 3:
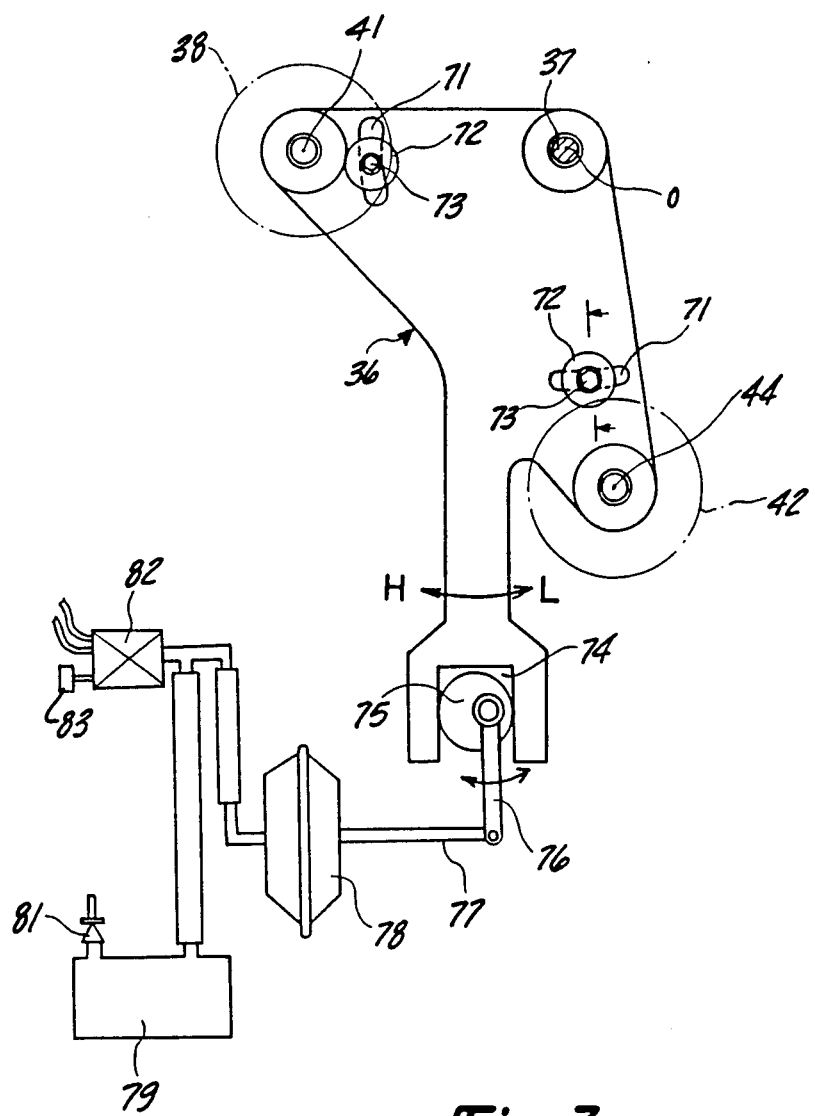
FIG. 3 is a schematic view, in part similar to FIG. 2, showing another embodiment of the invention.
Figure 4:
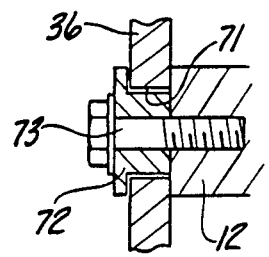
FIG. 4 is a cross-sectional view, on an enlarged scale, taken along the line 4—4 of FIG. 3.

FIGS. 3 and 4 show a slightly different embodiment of the invention wherein a different arrangement is employed for pivoting the timing lever 36 and which shows more details for the support of the timing lever 36. Except for these differences, this embodiment is the same as the embodiment of FIGS. 1 and 2 and, for that reason, only the timing lever, its support, and its actuating elements have been illustrated and will be described.

In this embodiment, the timing lever 36 is provided with a pair of arcuate slots 71 each of which is disposed adjacent a respective one of the pulleys 38 and 42 and which is curved about an arc that has its radius centered at the pivot axis O. A bearing member 72 extends into the slot 71 and is rotatably journaled on a pin 73 that is threaded into the cylinder block 12 so as to insure against any cocking movement of the lever 36 during its pivotal movement.

The lever 36 is provided with a forked recess 74 in which an eccentric cam 75 is carried. The eccentric cam 75 is connected to a lever 76 so that it may be rotated to change the angular position of the lever 36.

In order to drive the cam 75, the lever 76 is pivotally connected to an actuating rod 77 of a vacuum motor 78. The vacuum motor 78 is connected to a vacuum tank 79 which is evacuated by the intake manifold of the engine 79 by means including a check valve 81. The vacuum tank 79 is also connected to a solenoid valve 82 which is "T"ed into the connection to one side of the diaphragm of its vacuum motor so that the vacuum in the tank 79 and specifically on this side of the vacuum motor may be selectively bled to atmosphere through a vent 83. The valve 82 is controlled, as like the solenoid 45 of the previous embodiment, by means of any suitable engine parameters such as speed, load and/or temperature.

Figure 5:
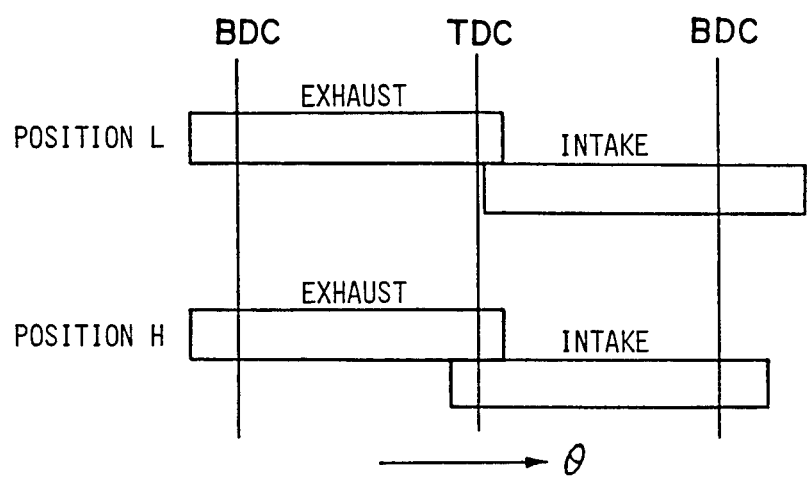
FIG. 5 is a chart showing the camshaft timing arrangement in accordance with the operation of the embodiments.

When the engine is running at a condition wherein minimum valve overlap is desired, such as at low speed or under certain temperature conditions, the solenoid valve 82 is in a condition so that the vacuum motor 78 is not vented to the atmosphere and full vacuum from the vacuum tank 79 is exerted. This will cause the rod 77 to be pulled to the left and rotate the cam 75 in a clockwise direction so as to rotate the lever 36 in a counterclockwise direction and achieve the minimum valve overlap as shown in the top of FIG. 5. However, as the sensed engine parameter changes, the solenoid valve 82 is selectively actuated so as to bleed off the vacuum and cause the internal spring of the diaphragm motor 78 to urge the rod 77 to the right and rotate the cam 75 in a counterclockwise direction. This rotates the lever 36 in a clockwise direction and advances the valve overlap, as aforenoted.

It should be readily apparent from the foregoing description that two embodiments of the invention have been illustrated and described each of which is effective to provide a relatively simple and yet high effective change in the valve timing. Although the invention is described in conjunction with the adjustment of the timing of the intake camshaft and intake valves, it should be readily apparent that the same principle may be applied to the exhaust valves or all of the valves of the engine. Various other changes and modifications may be made without departing from the spirit and scope of the invention, as defined in the appended claims.

I claim:

1. In a double overhead camshaft drive arrangement comprising a cylinder head, first and second camshafts journaled by said cylinder head, first and second driven pulleys each affixed for rotation about first and second parallel axes with a respective one of said camshafts, a drive pulley affixed for rotation with a drive shaft about a third axis parallel to said first and second axes to define with said first and second axes the apicies of a triangle, flexible transmitter means trained around said pulleys for driving said camshafts from said drive shaft, the improvement comprising an idler pulley disposed between said driven pulleys and rotatable about a fourth axis lying without the triangle, said flexible transmitter means passing over one of said driven pulleys then across said idler pulley and finally over the other of said driven pulleys and engaging substantially more than 180 degrees of the circumference of each of said driven pulleys and of said idler pulley.

2. In a double overhead camshaft drive arrangement as set forth in claim 1 wherein the diameter of the idler pulley is greater than the distance between the peripheral edges of the first and second driven pulleys.

3. In a double overhead camshaft drive arrangement as set forth in claim 1 the driveshaft comprises the crankshaft of the engine.

4. In a double overhead camshaft drive arrangement as set forth in claim 3 wherein the diameter of the idler pulley is greater than the distance between the peripheral edges of the first and second driven pulleys.

5. In a double overhead camshaft drive arrangement as set forth in claim 1 wherein the engine comprises a V type engine having a pair of cylinder banks and includes a second cylinder head and third and fourth camshaft journaled by a said second cylinder head, third and fourth driven pulleys each affixed for rotation about fifth and sixth parallel axes, a second idler pulley disposed between said third and fourth driven pulleys and rotatable about a seventh axis lying within a triangle defined by said third, fifth and sixth axes, said flexible transmitter means passing over one of said third drive pulleys, then across said second idler pulley, and finally over said fourth driven pulley and engaging substantially more than 180 degrees of the circumference of each of said third and fourth driven pulleys and said second idler pulley.

6. In a double overhead camshaft drive arrangement as set forth in claim 5 wherein the diameter of the idler pulley is greater than the distance between the peripheral edges of the first and second driven pulleys.

* * * * *